United States Patent [19]
Schneider, Jr. et al.

[11] Patent Number: 5,812,963
[45] Date of Patent: Sep. 22, 1998

[54] METHOD OF ANALYZING CAPABILITIES OF MIGRATION AND DMO COMPUTER SEISMIC DATA PROCESSING

[75] Inventors: William A. Schneider, Jr.; L. Don Pham, both of Houston, Tex.

[73] Assignee: Exxon Production Research Company, Houston, Tex.

[21] Appl. No.: 832,329

[22] Filed: Mar. 26, 1997

[51] Int. Cl.⁶ .................................................. G06F 19/00
[52] U.S. Cl. ............................................................... 702/17
[58] Field of Search ................................. 702/14, 16, 17, 702/18; 367/46, 72

[56] References Cited

U.S. PATENT DOCUMENTS 4,380,059  4/1983  Ruehle ....................................... 367/46

OTHER PUBLICATIONS

Berkhout et al, *Geophysics*, 54, 460–467 (1989).
Black et al., *Geophysics*, 58, 47–66 (1993).
Cerveny, The application of ray tracing to the propagation of shear waves in complex media: in seismic shear waves, ed. Dohr, G., Geophysical Press Ltd. (1985).
Gazdag, *Geophysics*, 43, 1342–1351 (1978).
Press, W.H. et al., Numerical Recipes in Fortran, 2nd ed.: Cambridge Univ. Press (1992).
Schleicher et al., *Geophysics*, 58, 1112–1126 (1993).
Schneider, *Geophysics*, 43, 49–76 (1978).
Sheriff, R.E., Encyclopedic Dictionary of Exploration Geophysics, 2nd ed.: Soc. of Expl. Geophys., (1989), pp. 38, 39, 84.
van Trier et al., *Geophysics*, 56, 812–821 (1991).

*Primary Examiner*—Donald E. McElheny, Jr.
*Attorney, Agent, or Firm*—Albert B. Kimball, Jr.

[57] ABSTRACT

Computer-implemented methods of processing and imaging seismic data by migration and DMO (dip moveout) are subjected to quantitative evaluation. The evaluation is done by a computerized testing procedure. An impulse data set is formed containing a single "live" trace and zero amplitudes for other traces. A selected velocity function is also generated. The impulse data set is then processed by the processing method being evaluated. Estimates of the vertical traveltime, amplitude and phase along each of the impulse-response events are then generated. The estimates so formed are compared against exact values obtained from a model using an integral equation which accurately describes migration or DMO. Users thus are provided with indications of how the processing techniques may be expected to perform on real data.

31 Claims, 16 Drawing Sheets

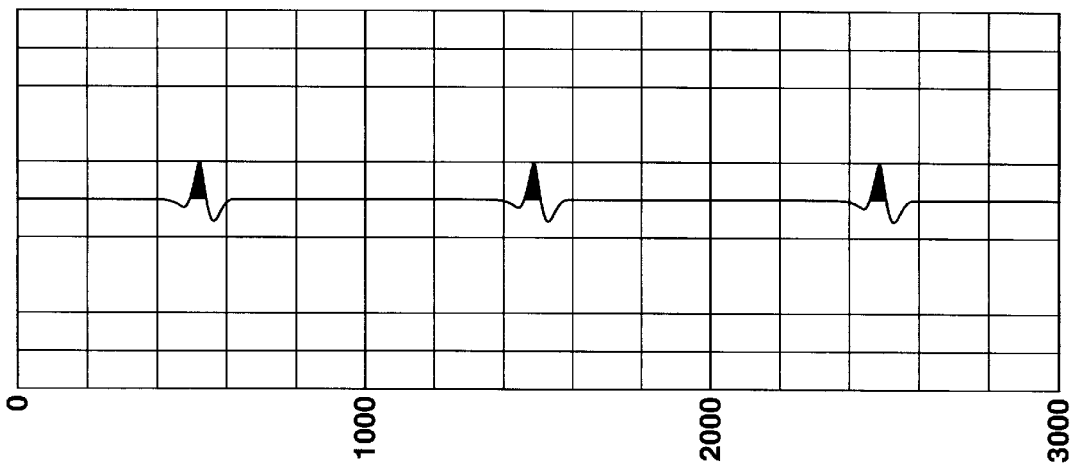
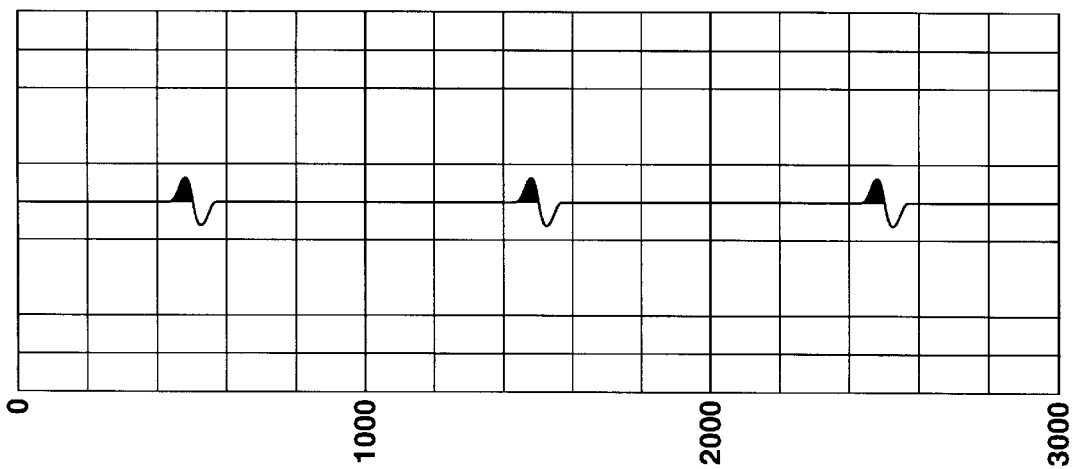
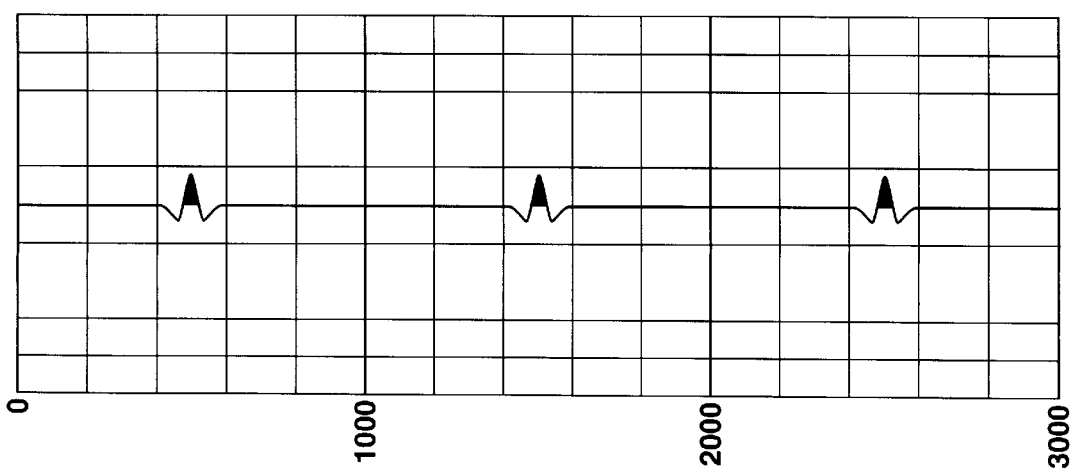

METHOD OF ANALYZING CAPABILITIES OF MIGRATION AND DMO COMPUTER SEISMIC DATA PROCESSING

BACKGROUND OF INVENTION:

1. FIELD OF INVENTION

The present invention relates to quality control of seismic data processing. More particularly, the present invention involves computerized quantitative evaluation of 3-D seismic imaging software, specifically migration and DMO or dip moveout software. 2. Description of Prior Art It has been widely known that no processing step alters the seismic data more than imaging with 3-D migration and DMO software. Imaging of seismic data in computers generally changes the position, amplitude, and phase of reflections as it converts them into images of reflectors. Many different types of migration have existed (time, depth, 2-D, 3-D, poststack and prestack) and there have been algorithms for each type (Kirchhoff, phase-shift, finite-difference, for example). There has been really only one type of DMO (time, in 2-D or 3-D), but there have been different algorithms for it (x-t, k-w, for example). Also, the fidelity or processing accuracy of a particular imaging algorithm is implementation-dependent, because of ever-present approximations. All of the foregoing factors have made it difficult to quantify the accuracy of particular imaging software.

Imaging software has commonly been tested by creating accurate synthetic data from some known earth model, passing these data through a migration or DMO program, and then comparing the output with the known answer from the model. This approach could be very accurate, but it was model-dependent, and creating accurate and proper 3-D synthetic data has been difficult.

Huygens' principle allowed for decomposition and imaging of data, after migration or DMO, into what in effect was a superposition of a number of impulse responses. Alternatively then, imaging software could be understood by analyzing impulse responses. An impulse response was formed by processing a special impulse data set with a migration or DMO program which was to be evaluated. The special impulse data set contained any number of "dead" traces (zero amplitudes), and just one "live" trace, having several wavelets separated in time.

Impulse responses were simple to make, and they were actual migration or DMO operators. Impulse responses of this type were thus used to qualitatively test imaging software. An impulse response was formed by processing the impulse data set with the program being evaluated. The results were then plotted and visually examined. Visual comparisons of impulse responses, from a variety of software being tested, allowed qualitative ranking of the software. But, this type of side-by-side visual comparison, much like beauty contests, was subjective and imprecise. Visual comparison and evaluation did not reveal how good or how bad the software really was.

SUMMARY OF INVENTION

Briefly, a computer-implemented method is performed according to the present invention to enable quantitative evaluation of the functionality or accuracy of computer software programs for imaging seismic data. The present invention thus permits evaluation of the imaging programs to be quantitative, so that it reveals precisely how good or bad the imaging software really is. An impulse data set is created in a programmed digital computer. The impulse data set contains a single live impulse data trace of one wavelet and a plurality of dead data traces. The impulse data set is then subjected to inverse filtering in the computer to compensate for natural filtering resulting from processing it with the imaging software program under evaluation.

The impulse data set is then processed in the computer using the computer imaging software program and a seismic velocity function which is representative of the seismic velocity of a portion of the earth's subsurface. This processing produces a set of processed impulse-response data traces. A set of corresponding theoretical impulse-response events is also obtained in the computer using the seismic velocity functions. The impulse-response formulas are derived from integral equations for migration and DMO. Output records or plots are formed of attributes such as vertical traveltime (or depth), amplitude, and phase, as predicted by these theoretical impulse responses against corresponding values measured from actual impulse-response data sets. The method of the present invention thus permits comparison of actual imaging software against theory. The plots so formed reveal just how closely imaging software agrees with theory.

For example, if an imaging operator exhibits an amplitude result, at 60° true-dip, which is ten times weaker than it should be, then the migration or DMO software will image a 60° reflector with an amplitude error of $1/10$. Also if an operator extends only out to 70° dip, then the software will not image any dips steeper than 70°. The method of the present invention produces such quantitative predictions. Impulse responses can thus be used to precisely understand an imaging program's operator, and thus generally predict its imaging performance.

The method of the present invention outlined generally above for migration/DMO impulse-response software evaluation is according to the sequence set forth below:

1. An impulse data set is created that contains one live trace and any number of dead traces. The live trace is located near the center of this data set, and the data set includes enough dead traces so that the resulting impulse response does not interact with the edges of the data set. The live trace contains one or more bandlimited, zero-phase wavelets that are separated in time so that they do not interfere. The live trace is then filtered with $(-i\omega)$, for 3-D migration, or $(i\omega)^{-\frac{1}{2}}$, for 2-D migration and DMO, where $\omega$ is frequency.

2. An appropriate velocity function is then created. The velocity function need not be of any exact form and to this extent may be somewhat arbitrary so long as it is realistic. Generally-variable velocity functions, $V(x,y,z)$, may be used to evaluate depth migration software, and depth-only variable velocity functions, $V(z)$, are most appropriate for evaluating time migration and DMO software.

3. The impulse data set is then processed with migration or DMO software for selected evaluation.

4. At least two of the actual impulse-response events in the processed result are then preferably selected. An estimate is made of the vertical traveltime (or depth), amplitude, and phase attributes along these events as functions of lateral distance, measured relative to the location of the live trace in the original impulse data set. Preferably, instantaneous phase is used for the phase attribute, but other measures may be acceptable.

5. Vertical traveltime (or depth), amplitude, and phase are then computed for the corresponding theoretical impulse-response events.

6. The theoretical amplitude curves are allowed to be out of scale with the imaging software by an arbitrary constant.

A scale factor is computed and all amplitudes are scaled, estimated from the actual response events. One actual amplitude curve is selected, along with its theoretical counterpart. The scale factor is set to equal the ratio of the two curves at the location of the original impulse trace. This value, SCALE, is set to equal $A_{theory, x=0}/A_{actual, x=0}$, where $x = 0$ refers to the location of the impulse trace. All actual amplitude curves are then multiplied by the SCALE value.

7. Vertical traveltime (or depth) is plotted for the actual and theoretical impulse-response events together, then the plotting process is repeated separately for the amplitude and phase attributes.

8. From the plots so formed, quantitative evaluation of the imaging software is now possible. This is done by observing how well the "actual" vertical traveltime (or depth), amplitude, and phase curves agree with their "theoretical-"counterparts. In this manner, the performance of an imaging program's operator can be quantitatively assessed and evaluated.

BRIEF DESCRIPTION OF DRAWINGS:

FIGS. 5A, 5B, and 5C are plots of an example impulse data set used according to the present invention.

DESCRIPTION OF PREFERRED EMBODIMENT

1. Physical Principles and Underlying Theory

The physical principles of seismic data processing performed during imaging are expressed by a set of theoretical, integral equations for 3-D poststack or zero offset migration, 3-D prestack migration, and DMO. The equations for each of these are discussed separately below, since the theory and equations differ for each. The equations are first reviewed from the natural perspective of imaging. Thereafter, an implementation made according to the present invention is discussed, using the equations to generate theoretical impulse responses to quantitatively evaluate imaging software.

Poststack seismic data represent approximate zero-offset data, but most poststack migration software relies upon the artificial, exploding-reflectors model, as disclosed for example in Sheriff, R. E., 1989, Encyclopedic Dictionary of Exploration Geophysics, 2nd ed.: Soc. of Expl. Geophys., Tulsa, OK. It is helpful to recall that the exploding-reflectors model assumes that all reflectors explode at time $t = 0$, waves propagate upward with the half-velocity, V/2, and receivers, located at the surface, record the wavefield. The exploding-reflectors model does not give amplitudes consistent with the true zero-offset model, and thus the exploding-reflectors is somewhat deficient. The kinematics for both models are almost always identical, however.

The present section explains how separate theory equations are developed representing 3-D poststack migration for the exploding-reflectors and zero-offset, amplitude models. The actual poststack migration software being tested almost always conforms to exploding-reflectors, with the possible exception of poststack Kirchhoff-migration programs, these being relatively expensive, however. Thus, the present invention permits users to test processing software against that model in a quantitative manner to learn how well the migration software meets its assumptions. Alternatively, users can test against the zero-offset model to see how much error the software really makes to their approximate zero-offset data. Equation (1) is discussed below while Equations (2–4) were obtained from available public literature for the purposes of "true-amplitude" imaging. True-amplitude migration programs remove geometric spreading from the data as they image, and true-amplitude DMO programs do not (by definition) alter the amplitude of planar reflections.

A. Exploding Reflectors Migration Equation Model

Figure 1:
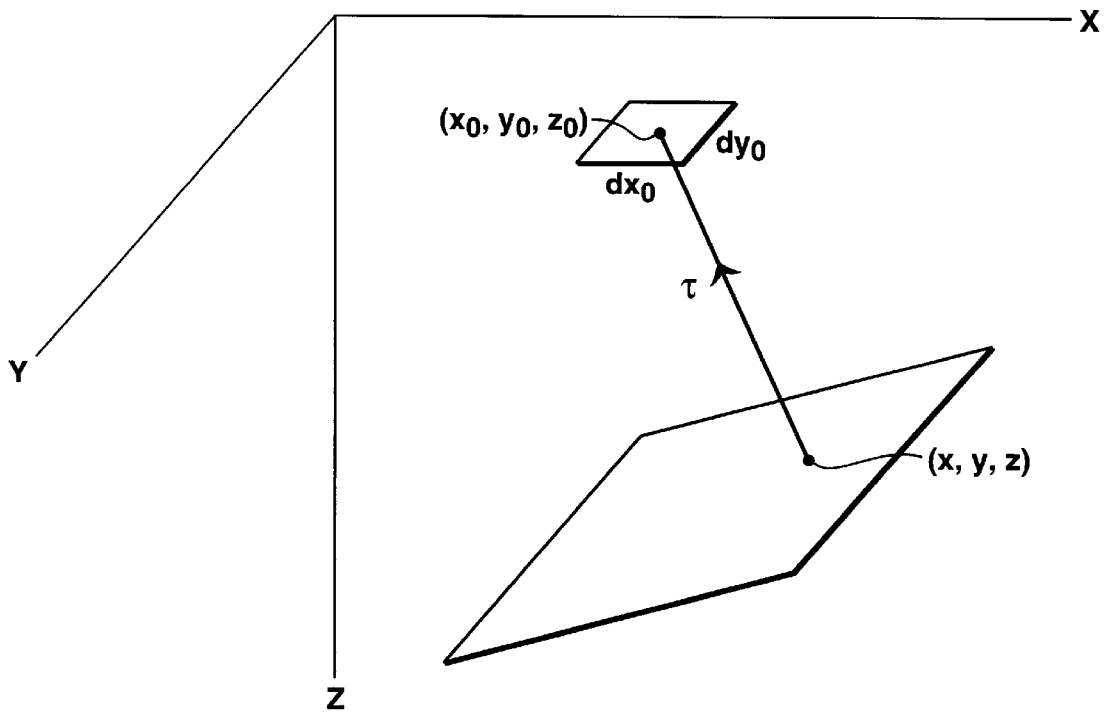
FIG. 1 is a diagram illustrating the geometry for exploding-reflectors migration.
Figure 2:
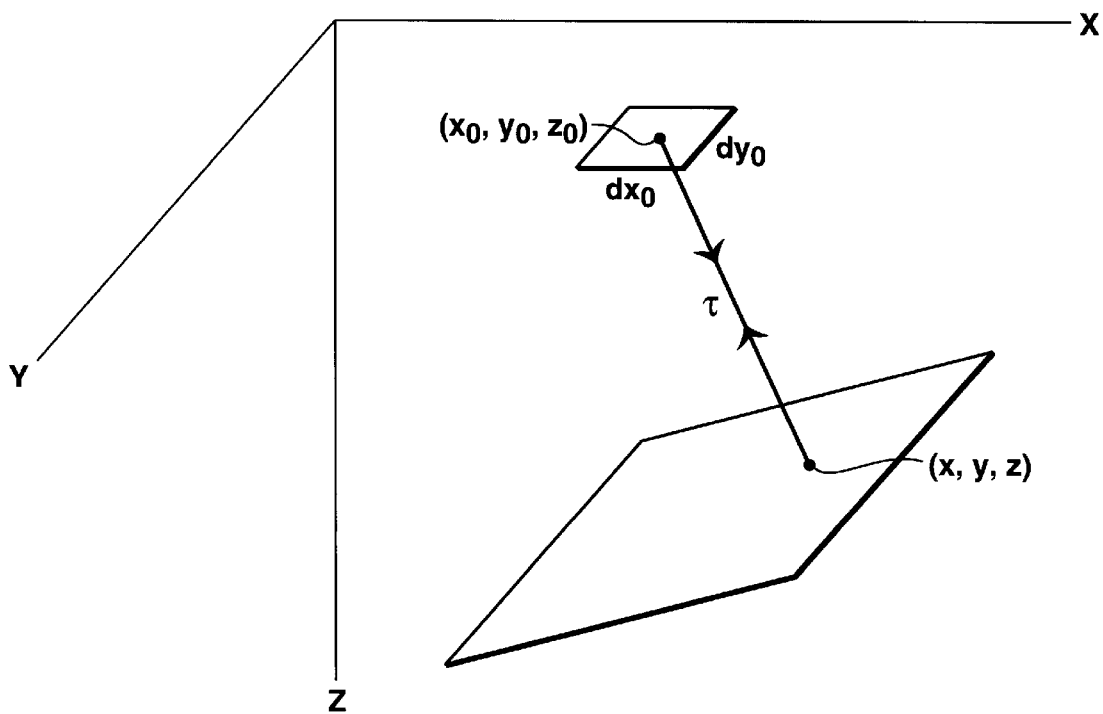
FIG. 2 is a diagram illustrating the geometry for zero offset migration.
Figure 3:
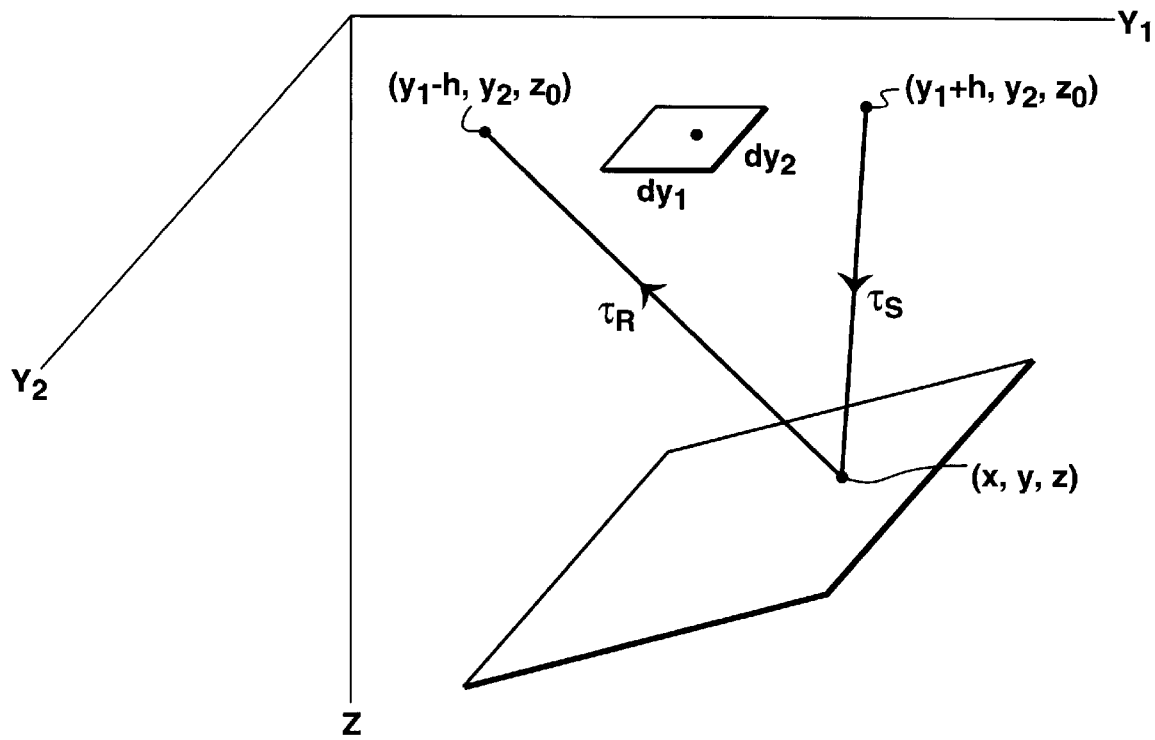
FIG. 3 is a diagram illustrating the geometry for common offset migration.
Figure 4:
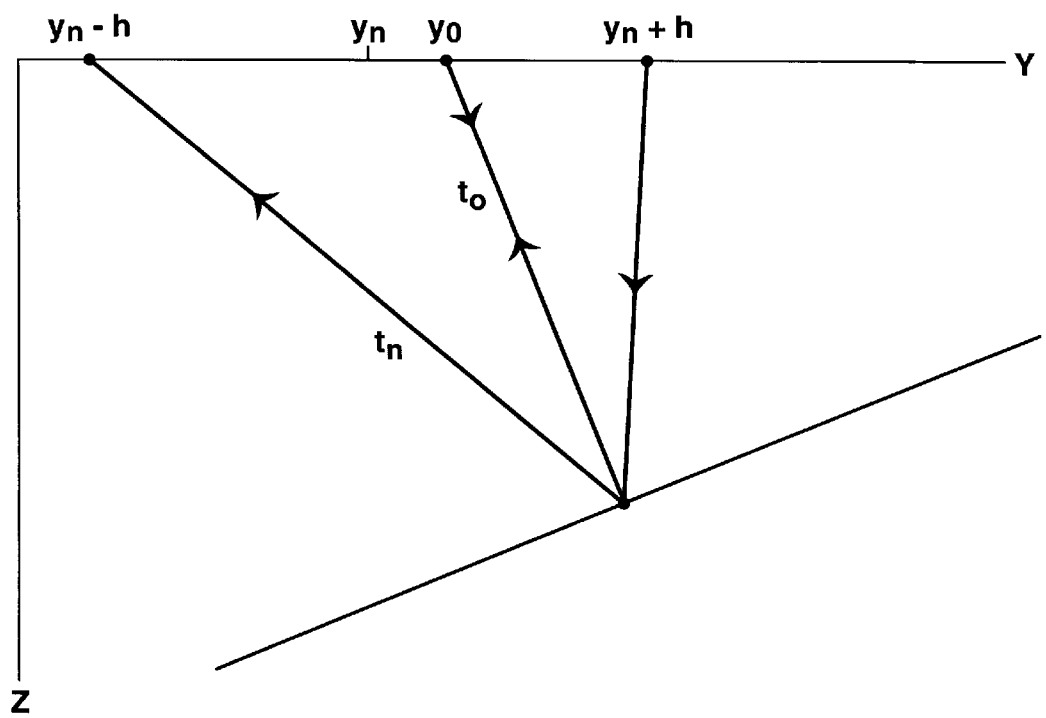
FIG. 4 is a diagram illustrating the geometry for common offset DMO.

True-amplitude, variable-velocity, exploding-reflectors migration in 3-D (FIG. 1) may be represented by:

$$P(x,y,z,t=0) = -\frac{1}{2\pi} \iint dx_0 dy_0 \cdot \frac{\partial \tau}{\partial z_0} \left( \sqrt{\frac{1}{\det Q}} \right)^* \cdot \left[ \frac{\partial P(x_0,y_0,z_0,t)}{\partial t} \right]_{t=\tau} \quad (1)$$

$$Q = \begin{pmatrix} Q_{11} & Q_{12} \\ Q_{21} & Q_{22} \end{pmatrix},$$

The integration surface is the plane, $z_0$=constant, containing the receivers. The image point is $(x,y,z)$, and the surface location of some receiver (representing a seismic trace) is $(x_0,y_0,z_0)$. Variable $\tau$ represents traveltime for a ray that propagates between the surface location and the image point, and $\sqrt{\det Q}$ represents geometric spreading incurred on this ray. Factor $\partial \tau/\partial z_0$ is "obliquity," equaling $2\cos\theta/V(x_0, y_0, z_0)$, where $\theta$ is the angle that the ray makes with the vertical at the surface location. The values $\tau$ and $\partial \tau/\partial z_0$ are computed with kinematic ray tracing and Q with dynamic ray tracing. Q is a 2×2 matrix, and det Q represents the determinant of matrix Q (see below).

Kinematic ray tracing involves solving the well-known differential equations describing 3-D rays for the coordinates, direction vectors, and traveltimes along rays. See, for example (Equations 3.1, of Cerveny, 1985, The application of ray tracing to the propagation of shear waves in complex media; in Seismic shear waves, ed. Dohr, G., Geophysical Press Ltd.) Dynamic ray tracing involves solving other well-known differential equations (Equations 5.22 and 6.27' of Cerveny, 1985) for the amplitudes everywhere along these computed rays. These differential equations are then solved numerically by integrating them with the well-known Runge-Kutta method (as discussed in Press, W.H., et al., 1992, Numerical Recipes in Fortran, 2nd ed.: Cambridge Univ. Press. The general Kirchhoff integral of Equation (1) is validated by Berkhout and Wapenaar (1989), One-way versions of the Kirchhoff Integral; Geophysics, 54, 460–467 for variable velocity. Classic derivations of Kirchhoff integrals assume constant velocity, as described by Schneider, W. A. (1978), Integral formulation for migration in two and three dimensions: Geophysics, 43:49-76.65

B. Zero Offset Migration Equation Model

True-amplitude, variable-velocity, zero-offset migration in 3-D may be represented by, $$P(x,y,z,t=0) = -\frac{1}{2\pi} \iint dx_0 dy_0 \cdot \frac{\partial \tau}{\partial z_0} \cdot \left[ \frac{\partial P(x_0,y_0,z_0,t)}{\partial t} \right]_{t=\tau} \quad (2)$$

Equation (2) lacks the $\sqrt{\det Q}$ factor of Equation (1), but is otherwise identical. The simpler Equation (2) is more accurate for migrating conventional seismic data because it does zero-offset amplitude corrections. Kirchhoff 3-D poststack migration is not common in practice, however, because other methods are more efficient. Equations (1) and (2) are both used in processing with the present invention to evaluate impulse responses of production 3-D poststack migration software. Equation (2) is disclosed by Schleicher, J. , et al. (1993) 3-D true-amplitude finite-offset migration: Geophysics, 58:1112–1126 (his equations 5 and 21).

C. Common Offset Migration Equation Model True-amplitude, variable-velocity, common-offset migration in 3-D may be represented by:

$$P_h(x,y,z,t=0) = -\frac{1}{2\pi} \iint dy_1 dy_2 \cdot \quad (3)$$

$$w(y_P y_2, z_0, h, x, y, z) \cdot \left[ \frac{\partial P(y_1, y_2, h, z_0, t)}{\partial t} \right]_{t=\tau_S+\tau_G}$$

$$w = \frac{\sqrt{\cos\theta_S \cos\theta_G}}{V_S} \cdot \frac{|\det(N_{SM} + N_{GM})|}{\sqrt{|\det(N_{SM})| \cdot |\det(N_{GM})|}}$$

The integration surface is the plane, $z_0$ =constant, containing the sources and receivers. This equation is disclosed in Schleicher, J. , et al. (1993) 3-D true-amplitude finite-offset migration: Geophysics, 58:1112–1126 (his equations 5 and 22) for the true-amplitude migration of common-offset 3-D data. Quantity h represents the constant, half-offset value, and $y_1$ and $y_2$ represent midpoint coordinates, in two orthogonal directions on the recording surface (inline and crossline directions). The image point is M =(x,y,z), source location is S =($y_1$ +h,$y_2$,$z_0$), and receiver location is G =($y_1$-h,$y_2$,$z_0$). It is to be noted that S and G may be defined in other ways, but the distance between S and G must always equal 2h, as required for common-offset data. Variables $\tau_S$, and $\tau_G$ represent traveltimes for rays that connect points S with M, and G with M, respectively, and $\theta_S$ and $\theta_G$ are angles that these rays make with the vertical at points S and G. $V_S$ is the velocity at point S. Finally, $N_{SM}$ and $N_{GM}$ are 2×2 Hessian matrices of the traveltimes $\tau_S$ and $\tau_G$ as defined in Schleicher, J., et al. (1993) 3-D true-amplitude finite-offset migration: Geophysics, 58:1112–1126 - (his equations 17 and 18). The components of these matrices are second derivatives of travel times, $\tau_S$ and $\tau_G$, with respect to lateral spatial coordinates. Equation (3) is used to evaluate production 3-D common-offset migration software.

Traveltimes, $\tau_S$ and $\tau_G$, and angles $\theta_S$ and $\theta_G$, may be computed as indicated by Schleicher et al (1993) by kinematic ray tracing. In this case, matrices, $N_{SM}$ and $N_{GM}$, may be computed by dynamic ray tracing. These quantities may alternatively be computed by specialized 3-D traveltime-calculation methods (such as Schneider Jr., W. A, 1995 Robust and efficient upwind finite-difference traveltime calculations in three dimensions: Geophysics, 60:1108–1117). In this case, the various traveltime derivatives may be computed by finite differencing (see Press, W. H., et al., 1992, Numerical Recipes in Fortran, 2nd ed.: Cambridge Univ. Press.) the computed 3-D traveltime fields. When the velocity varies with depth only, as assumed when using Equation (3) to evaluate 3-D prestack time migration software, then it can be seen that the weight function, w, and the traveltimes, $\tau_S$ and $\tau_G$, may all be computed with simple 2-D traveltime-calculation methods. An example of this is described, for example, in van Trier, J. and Symes, W. W., 1991, Upwind finite-difference calculation of traveltimes: Geophysics, 56:812–921, with the 2-D stability condition published in Schneider Jr., W. A.,1995, Robust and efficient upwind finite-difference traveltime calculations in three dimensions: Geophysics, 60:1108–1117. In this case, it can also be seen that the computation of the matrices NSM and NGM is much simplified-they are easily computed from 2-D finite-difference traveltime derivatives.

D. Common Offset DMO Equation Model

True-amplitude, variable-velocity, common-offset DMO in 3-D or 2-D may be represented by:

$$P_0(y_0,t_0,h) = \int_{-h}^{h} d\eta \, w(y_0,y_n,t_0,t_n,h) \cdot \quad (4)$$

$$P_n[y_n(y_0,\eta),t_n(t_0,\eta), h] * \delta_{1/2}[-t_n(t_0,\eta)]$$

$$\delta_{1/2}(t_n) = \frac{1}{2\pi} \int d\omega (i\omega)^{1/2} e^{i\omega t_n},$$

This expression has been developed from equation (31) of Black et al (1993). Here * represents temporal convolution, ω represents frequency, and the y direction is the direction of the line connecting the source and receiver. Then $y_n$ is midpoint coordinate measured along this line before DMO (where half-offset equals h), and $y_0$ is 5 midpoint coordinate measured along this line after DMO (where half-offset equals zero). Variables $t_n$ and to represent time on a seismic trace at half-offsets, h and 0, respectively, and $t_n$≡$t_n$($t_0$, η)=$t_0$(1-$\eta^2$/$h^2$)$^{-\frac{1}{2}}$, where η=$y_n$-$y_0$. Thus, $y_n$≡$y_n$($y_0$, η)=$y_0$+ η. Plus, $P_n$ and $P_0$ represent the common-offset data before and after DMO, at half-offsets h and zero, respectively. It is to be noted that the familiar $(i\omega)^{1/2}$ filter is represented through the time-domain convolution operator $\delta_{1/2}(-t_n)$, but the filter may still be applied in the frequency domain, as is usually preferable.

This general integral formulation for DMO is well-known, but the weight function, w, for true amplitude is attributed to Black, J. L., et al. (1993). True-amplitude imaging and dip moveout: Geophysics, 58:47–66. Their weight function, modified to accommodate Equation (4) above is $$w(y_0,y_n,t_0,t_n,h) = \left( \frac{a(\eta)t_0}{2\pi} \right)^{1/2} \left[ \frac{2a(\eta)^2 - 1}{h} \right] \quad (5)$$

where $a(\eta)=(1\eta^2/h^2)^{-1/2}$

Equations (1, 2, and 3) above may be converted from 3-D to 2-D by making assumptions about how the source wavefield varies in the y-direction and that the earth model does not vary in the y-direction, then performing the $y_0$ and $y_2$ integrals analytically. The integrals then represent 2-D migration, and can be used to evaluate 2-D imaging software. This embodiment of the present invention focuses on 3-D imaging, but the methods herein described easily extend to 2-D imaging software.

2. Theoretical Impulse Responses from the Integral Equations

According to the present invention, the theoretical impulse responses described above are used to evaluate actual, computed impulse responses. A theoretical impulse response is extracted from each of equations (1 through 4) above, and these analytical representations are used to generate theoretical impulse response curves.

This is done for Equation (1) by inserting the wavefield, $$P(\chi_0, y_0, z_0, t) = \delta(\chi_0 - \chi_1) \cdot \delta(y_0 - y_1) \cdot R(t - t_1) \tag{6}$$

where $\delta$ represents the dirac delta function, and $R(t)$ is a zero-phase wavelet, with $R(0)$ representing the central wavelet peak. Such an insertion yields the result, $$P(x,y,x,t=0) = -\frac{1}{2\pi} \cdot \frac{\partial \tau}{\partial z_0} \cdot \tag{7}$$

$$\left(\sqrt{\frac{1}{\det Q}}\right)^* \cdot \left[\frac{\partial}{\partial t} R(t - t_1)\right]_{t=\tau}$$

where $\tau = \tau(x, y, z; x_1, y_1, z_0)$, $\partial\tau/\partial z_0 = 2\cos\theta/V(x_1,y_1,z_0)$, and $Q = Q(x,y,z;x_1,y_1,z_0)$ are computed by tracing rays and performing dynamnic ray tracing between the fixed surface point $(x_1, y_1, z_0)$ and all possible image points $(x,y,z,)$. Equation (7) is nonzero only for $(x,y,z)$ such that $\tau \approx t_1$, where the wavelet assumes its peak, so Equation (7) extracts one 3-D surface from the volume of possible image points $(x,y,z)$ and this represents the impulse response of Equation (1). For a fixed impulse time, $t_1$, the data values for a surface so defined are computed and this surface is saved in memory. Also, the amplitude and phase associated with it are similarly obtained and saved. The associated phase is developed in a manner explained below. Curves extracted from this impulse response are then plotted against curves estimated from actual impulse-response events, as described previously.

The theoretical impulse response for Equation (2) is Equation (7) with the det Q factor removed. The theoretical impulse response is extracted from Equation (3) by inserting the wavefield, $$P(y_1, y_2, h, z_0, t) = \delta(y_1 - \zeta_1) \cdot \delta(y_2 - \zeta_2) \cdot R(t - t_1) \tag{8}$$

and obtaining $$P_h(x,y,z,t=0) = -\frac{1}{2\pi} \cdot w(\zeta_1, \zeta_2, z_0, h, x, y, z) \cdot \left[\frac{\partial}{\partial t} R(t - t_1)\right]_{t=\tau_S + \tau_G} \tag{9}$$

where in Equation (9), $\tau_S = \tau_S(x,y,z;\zeta_1+h, \zeta_2, Z_0)$ and $\tau_G = \tau_g (x,y,z;\zeta_1-h, \zeta_2, z_0)$ are traveltimes for rays that travel between the fixed source, $S = (\zeta_1+h, \zeta_2, z_0)$, and receiver, $G = (\zeta_1-h, \zeta_2, z_0)$, locations respectively, and all possible image points $M - M (x,y,z)$. The weight function, $w(\zeta_1, \zeta_2, z_0, h, x, y, z)$ is computed for each pair of these traveltimes, $\tau_S$ and $\tau_G$. Equation (8) is nonzero only for $(x,y,z)$ such that $\tau_S + \tau_G \approx t_1$, where the wavelet assumes its peak, so Equation (8) extracts one 3-D surface, from the volume of possible image points $(x,y,z)$, and this represents the impulse response of Equation (3). For fixed impulse time, $t_1$, the data values for a surface so defined are computed and this surface is stored in memory. The weight function and phase associated with it are similarly obtained and stored. Curves extracted from this impulse response are again plotted against curves estimated from actual impulse-response events, as described previously.

The theoretical impulse response from Equation (4), for DMO, is extracted by inserting the wavefield, $$P_n(y_n, t_n, h) = \delta(y_n(y_0, \eta) - \zeta) \cdot R(t_n(t_0, \eta) - T) \tag{10}$$

and using the previous-defined relations $y_n = Y_0 + \eta$ and $t^n = t_0(1-\eta^2/h^2)^{-1/2}$, to get $$P_0(y_0, t_0, h) = w(y_0, \zeta, t_0, a(n_0)t_0, h) \cdot \tag{11}$$

$$\delta_{1/2}(-a(n_0)t_0)^* R(a(n_0)t_0 - T)$$

$$= \left(\frac{a(n_0) t_0}{2\pi}\right)^{1/2} \left[\frac{2a(\eta_0) - 1}{h}\right] \cdot$$

$$\delta_{1/2}(-a(b_0)t_0) * R (a(\eta_0) t_0 - T)$$

where $a(\eta_0) = (1 - \eta^2_0/h^2)^{-1/2}$ Here $\eta_0 = \zeta - y_0$.

Equation (10) is nonzero only for $(y_0, t_0)$ such that $a(\eta_0)t_0 \approx T$, where the wavelet assumes its peak, so Equation (10) extracts one 2-D curve, from the range of possible image points $(y_0, t_0)$, and this represents the impulse response of Equation (4). For a fixed impulse time, T, the data values for a surface so defined are computed again and saved or stored along with the amplitude and phase associated with it. Curves in extracted form of this impulse response are then plotted against curves estimated from actual impulse-response events, as described previously.

3. Impulse-Response Phase

The −1 scaling and time derivatives in Equations (1), (2), and (3) may be interpreted as frequency-domain filtering operations because $\partial/\partial t$ Fourier transforms to $i\omega$, where $\omega$ is frequency, and −1 scaling represents a 180° phase shift. The convolution with the "half-derivative" operator, $\delta_{1/2}$, in Equation (4) also implies a frequency-domain filter of $(i\omega)^{1/2}$. Generally, $-i\omega$ filters associate with 3-D imaging software and $(i\omega)^{1/2}$ filters associate with 2-D imaging software, including all forms of DMO. Interpretation of these filters is easy: $i\omega$ scales the Fourier components of the data by $\omega$ and introduces a constant 90° phase shift, and $(i\omega)^{1/2}$ scales the Fourier components of the data by $(\omega)^{1/2}$ and introduces a constant 45° phase shift.

The analysis is simplified and these filters are accounted for by applying their inverses to the original impulse trace, when creating the impulse data set (see Section 1 above). That way all wavelets on computed impulse responses are expected to be the original zero-phase Ricker wavelets, and zero is used for the theoretical phase. Thus, the derivative operators and −1 scalings in Equations 7, 9 and 11 are ignored when computing theory curves for comparison with actual impulse responses generated by imaging software.

Imaging software will apply a time- and dip- varying, "stretch" to the wavelet. The theory here discussed does not account for this, but the phenomenon is easily recognized and understood from the QC plots (see subsequent examples).

4. Velocity and its Impact

The method and theory described above, with the exception of DMO theory, is valid for variable velocity models, $V = V(x,y,z)$. Wave propagation quickly becomes very complicated when V becomes complicated—computed impulse responses may contain triplications or "bow ties" making any impulse-response event multivalued in the (x,y) coordinates. Impulse responses may also contain diffractions for complicated V. Such things make computing the theoretical impulse-response curves difficult. Also, ray theory may differ considerably from wave theory when V becomes complicated, which may invalidate the theoretical operators. There are acceptable solutions to these difficulties, such as computing the theoretical impulse-responses with the method of Gaussian beams (see Cerveny, 1985, The application of ray tracing to the propagation of shear waves in complex media: in Seismic shear waves, ed. Dohr, G., Geophysical Press Ltd.), or even with wave theory, although these alternatives could be expensive. With the present invention, it is preferable to restrict the velocity model. In this way ray theory still approximates wave theory well, and the theoretical curves are easily computed. Such a restriction is a smooth velocity field, or even one that varies only in depth, $V = V(z)$. For most purposes, such models are adequate for software evaluation, especially for 3-D time-migration and DMO software, the most commonly-used imaging software today.

The method may also be applied to 2-D migration software, although this is believed to be less important today than 3-D imaging, so the preferred mode is to operate in 3-D. Any wavelet can be used to construct the original impulse trace, but it is believed that a zero-phase wavelet is most appropriate, because it simplifies the subsequent phase analysis. The preferred zero-phase wavelet is of the type known as the Ricker wavelet (FIGS. 5A, 5B, and 5C).

5. Example

Figure 6:
FIG. 6 is a plot of output data traces representing a computed impulse response formed according to the present invention.

The general method of the present invention can be illustrated for 3-D poststack time migration using a smooth, V(z) velocity function that was derived from North Sea data. The impulse data set contained 360 traces in the x and y directions, respectively, trace spacing were $\Delta x=12.5m$ and $\Delta y=25m$, representing realistic sampling. Center frequency for the impulse trace of the Ricker wavelet was 40 Hz. The impulse trace was the center trace in this data volume, and it contained three wavelets, at times 1, 2, and 3 s, respectively. The origin of coordinates was defined to be the surface location of the original impulse trace. The data set was processed with a 3-D poststack time-migration program, based upon the phase-shift algorithm (see Gazdag, J., 1978, Wave equation migration with the phase-shift method: Geophysics, 43:1342–1351). Impulse-responses for V(z) velocity should be symmetric about the impulse trace. Thus, single vertical slices were analyzed through the 3-D impulse response. FIG. 6 shows traces extracted from the 3-D impulse-response volume, along the entire positive y-axis (the leftmost trace represents the original impulse trace, where x, y=0,0). Trace spacing in FIG. 6 is 25 m.

Figure 18:
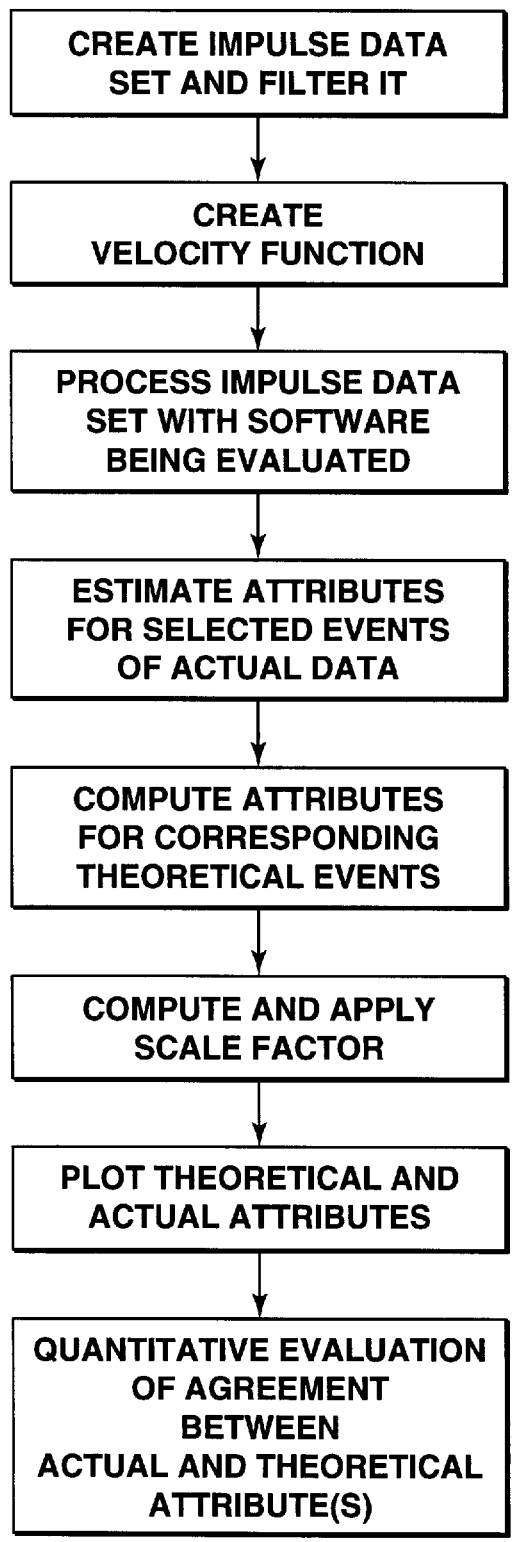
FIG. 18 is a schematic diagram or flow chart of the process steps of the present invention.

A computer QC program was written that takes an actual impulse response, automatically digitizes selected impulse-response events, and tabulates vertical traveltime, amplitude, and instantaneously phase for the events, all as functions of the horizontal coordinate (y, in the case of FIG. 6). The functions of that program are illustrated in FIG. 18. The sequence of steps of how those functions are performed has been set forth above. The program computes theoretical curves, corresponding to the impulse-response events, using the appropriate equation (7), (9), or (11). Equation (7) applies with respect to FIG. 1. Finally, the program plotted the theoretical curves against those derived from the actual impulse response.

Figure 7:
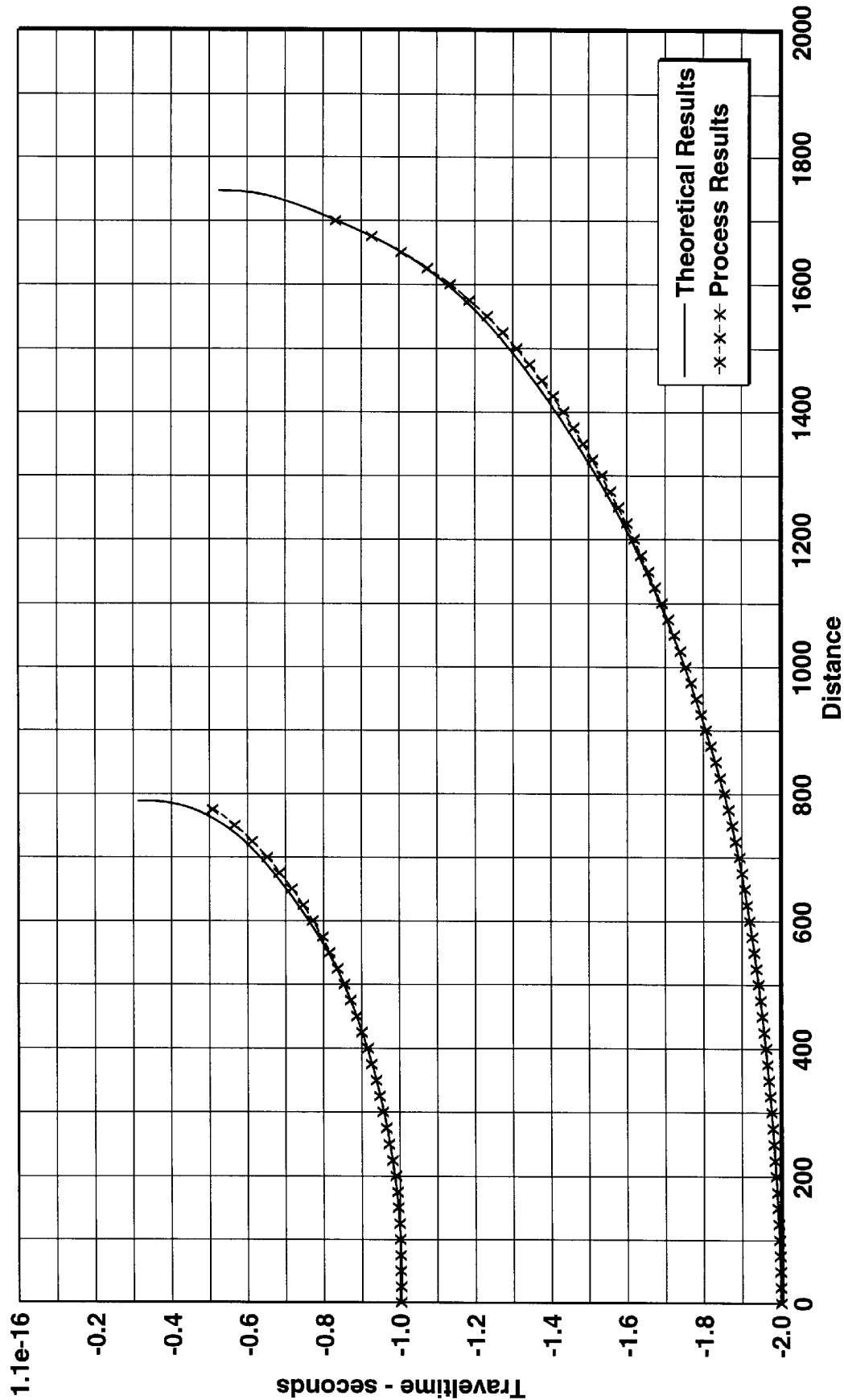
FIGS. 7, 8, 9 and 10 are comparative plots of data processing test results against values obtained from an integral equation accurately representative of migration.
Figure 8:
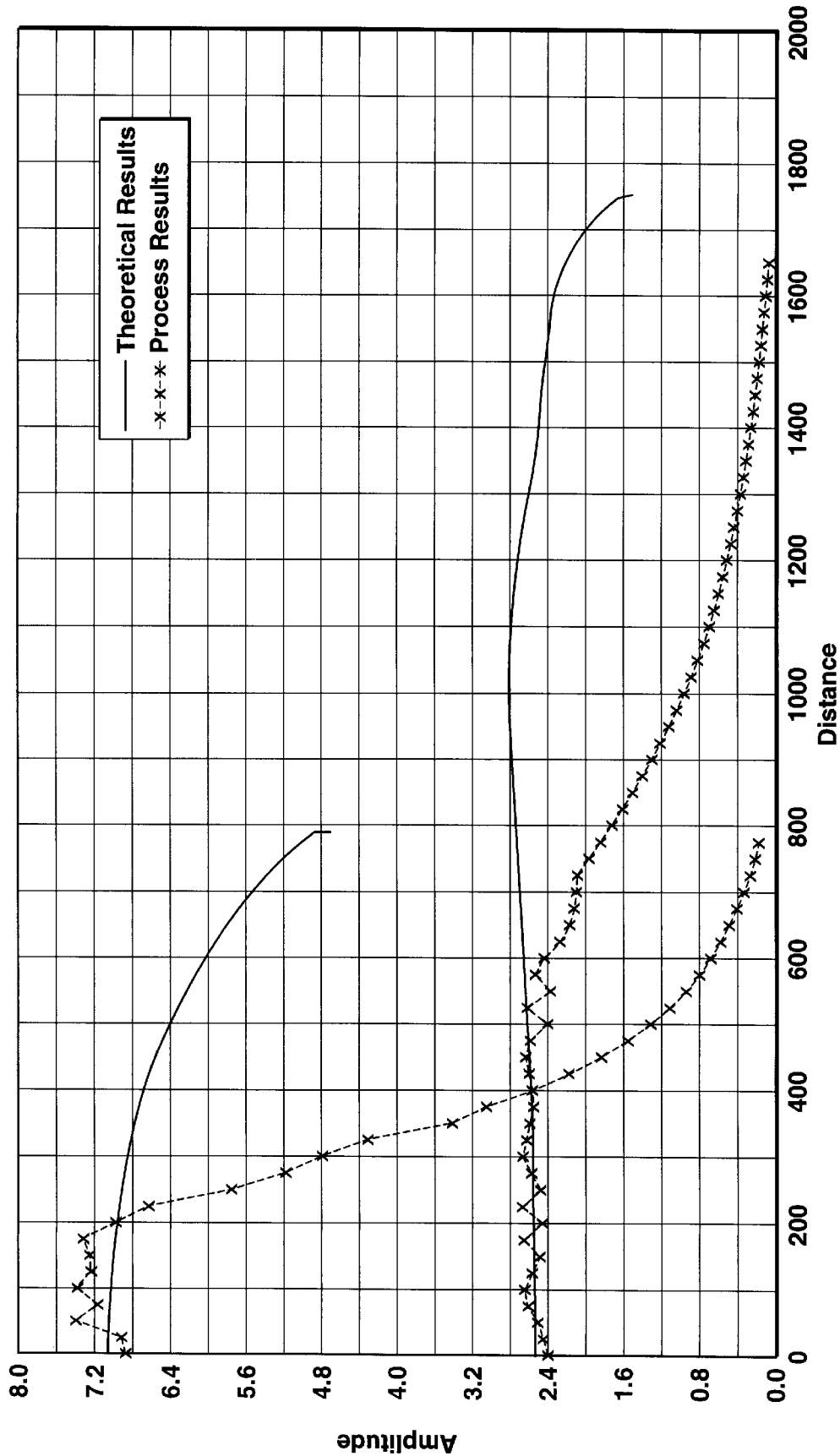
Figure 9:
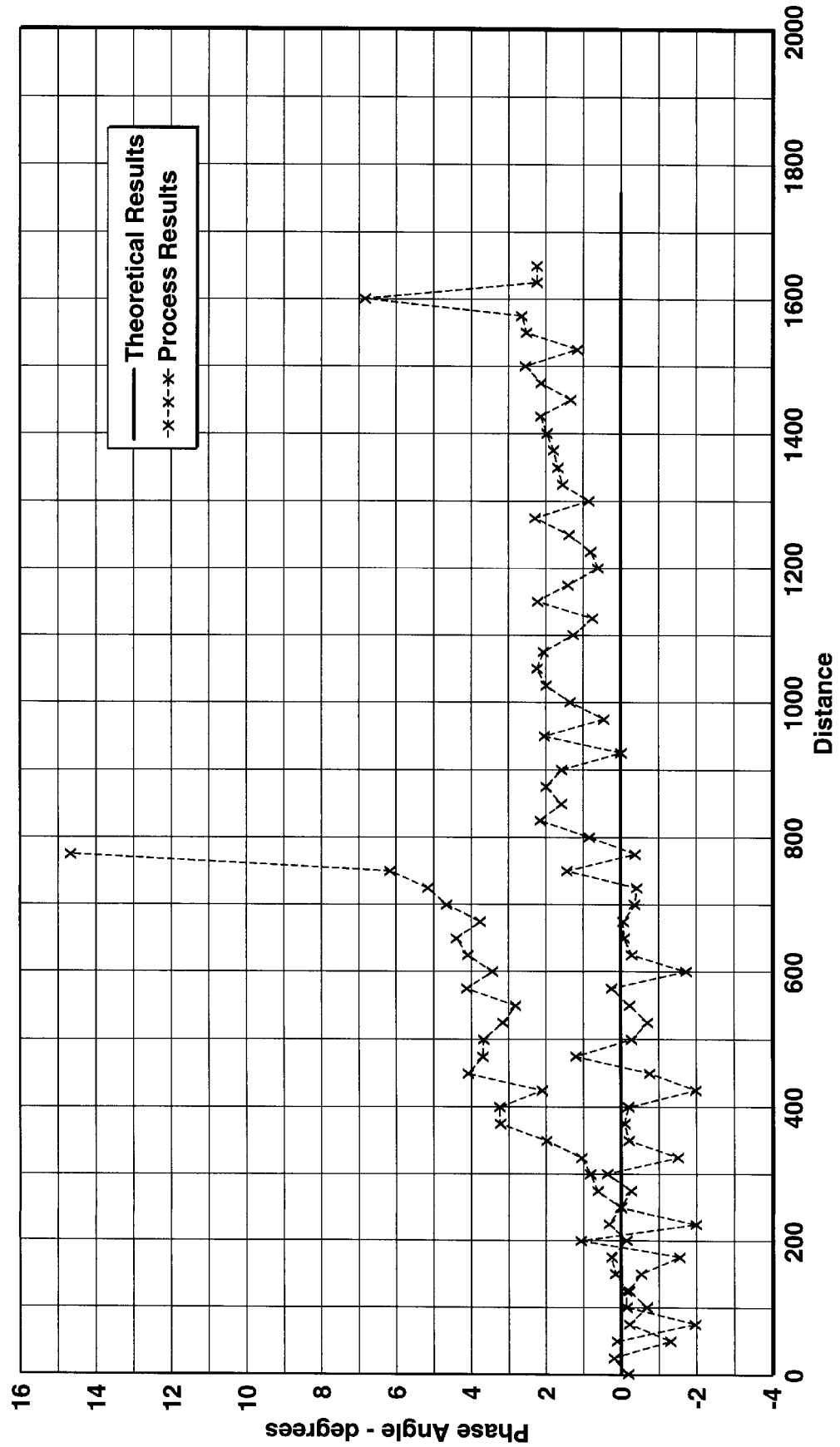
Figure 10:
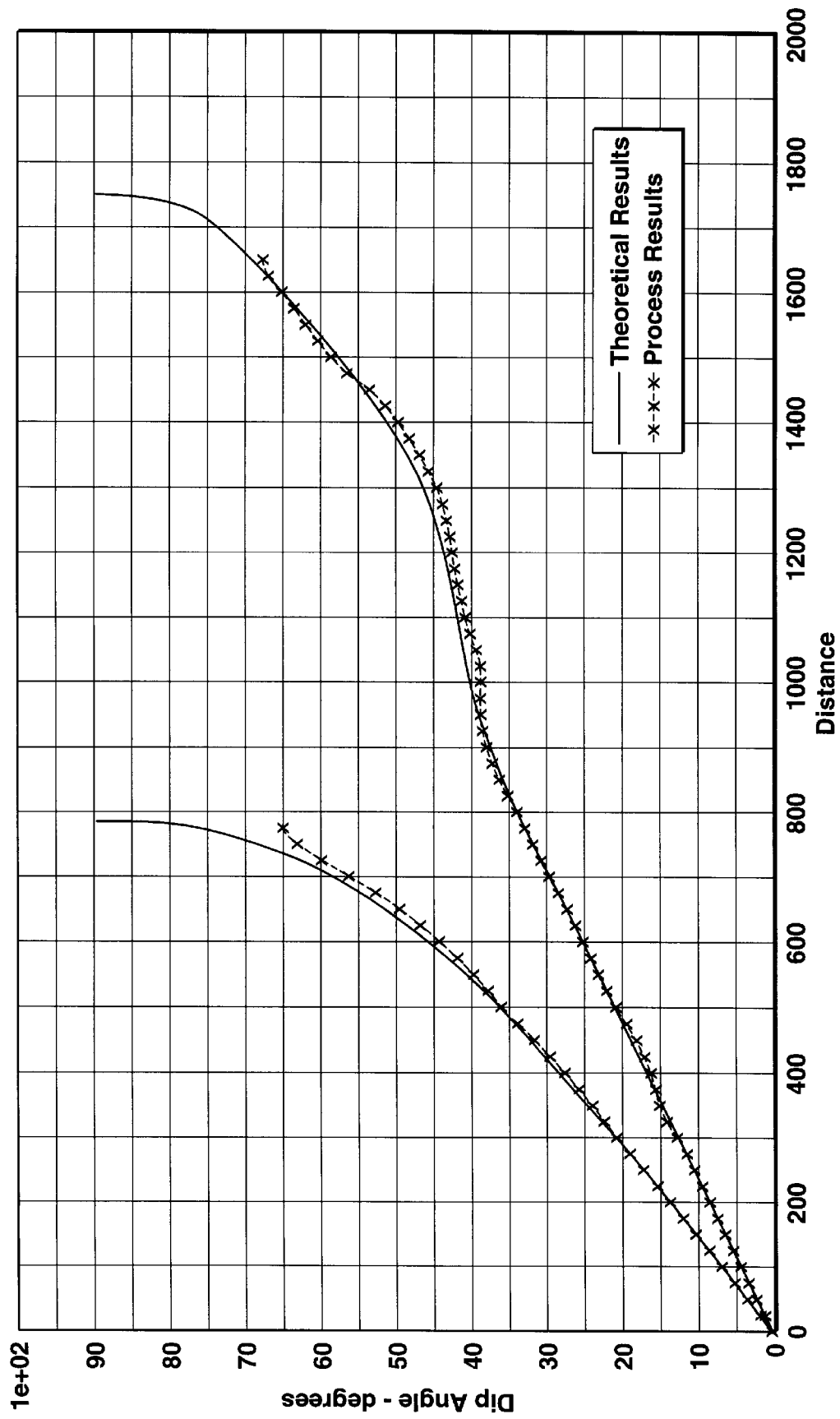

FIGS. 7, 8, 9, and 10 represent these plots for the data of FIG. 6. FIG. 7 shows vertical traveltime for the events corresponding to original impulse times of one and two seconds. Theory curves are solid, and curves derived from the actual impulse response are dashed. FIG. 7 shows that vertical traveltimes agree well, although the dashed curves do not extend out as far as the solid curves. FIG. 8 is the comparable amplitude plot, which reveals that the actual amplitudes oscillate up to 15% about the correct amplitudes. The actual amplitudes can be seen to agree well for small y distances (0–200m on the top curve and 0–600 m on the bottom curve), while the actual amplitudes drop off quickly with y-distance. The two dashed curves were scaled by one scale factor, SCALE (defined previously), to match them to the solid curves. Good agreement is noted, especially at the left edge of the plot. The oscillation is an implementation artifact, caused by setting a user-parameter to save costs at the expense of accuracy. The drop off, however, is the natural and expected consequence of spatial aliasing. The amplitude oscillation is not desirable because it represents coherent noise that will appear in migrated images. FIG. 9 is the related phase plot, where phase of both events is near zero, except for slight deviations at large y-distance because of wavelet stretch, as mentioned previously. FIG. 10 shows true-dip angle versus y-distance, and this plot may be used to convert the horizontal axes of the other plots from distance to true-dip angle. For example, the amplitude curve corresponding to the original impulse time of 2 s, in FIG. 8, agrees well with theory for dip angles under 25°. The corresponding vertical traveltime curve in FIG. 7 extends out to dip angles of almost 70°, but amplitude at these high dips has been severely attenuated.

Figure 11:
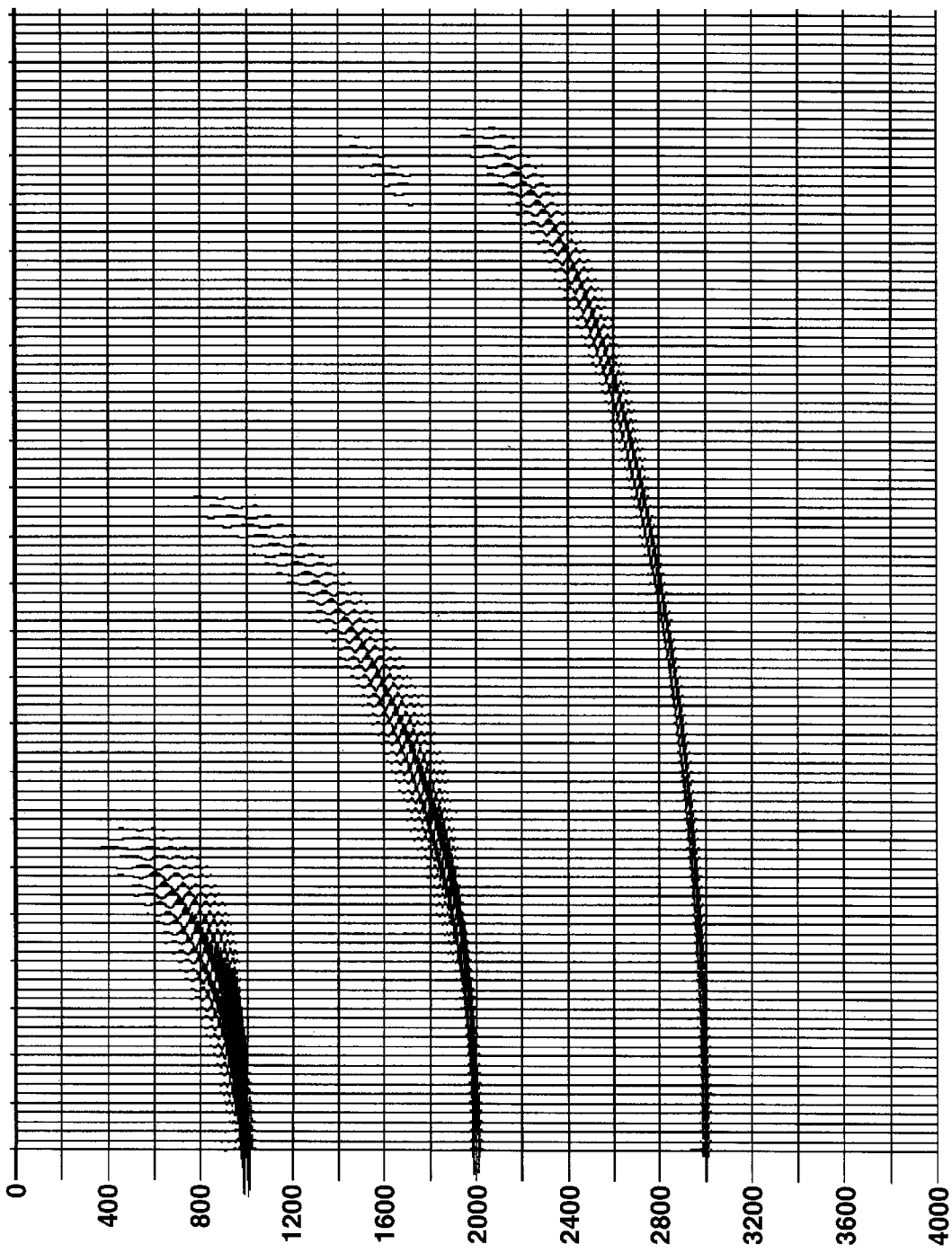
FIG. 11 is another plot of output data traces representing a computed impulse response formed according to the present invention.
Figure 12:
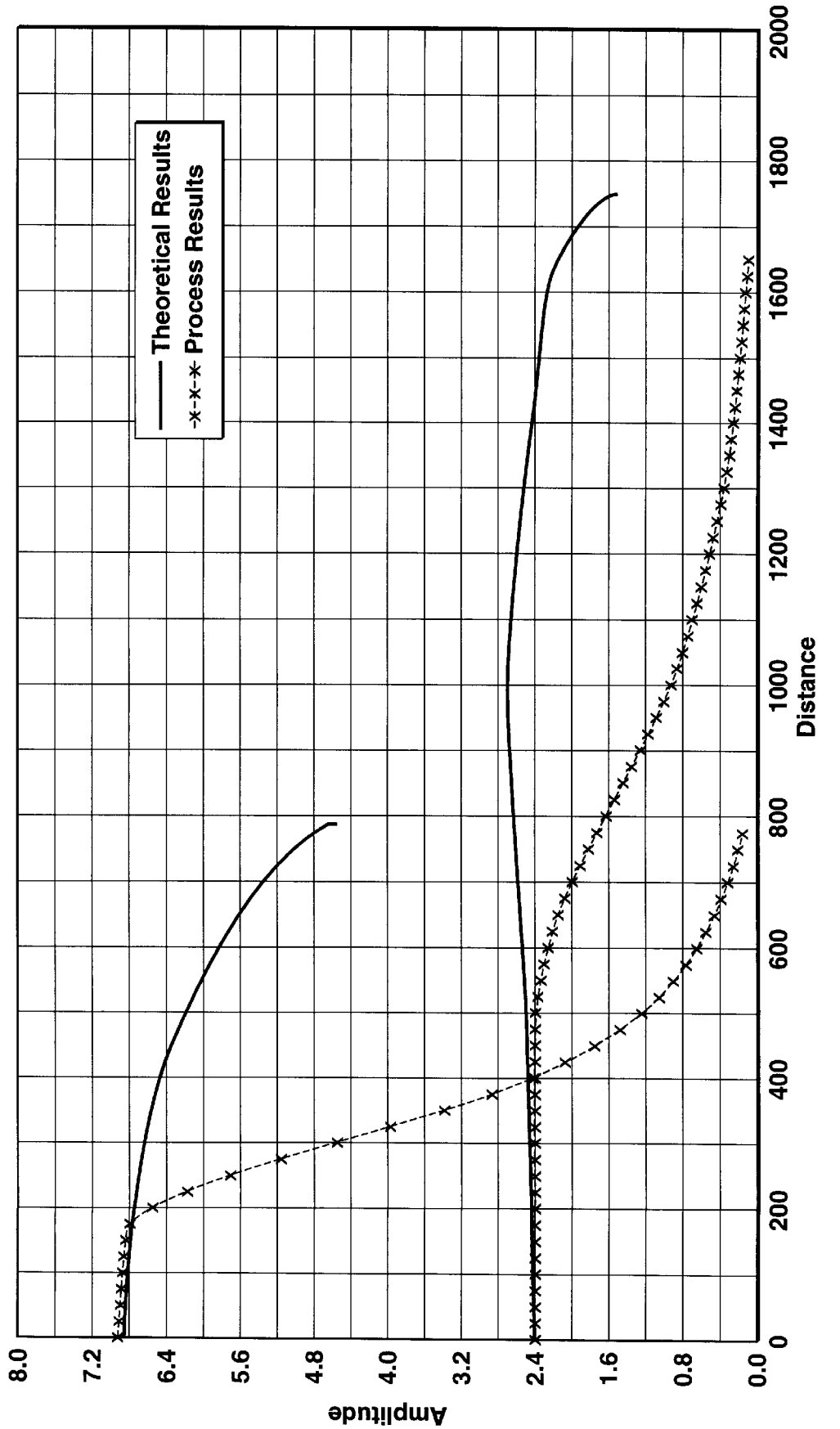
FIGS. 12, 13 and 14 are comparative plots of data processing test results against values obtained from an integral equation accurately representative of migration.

The migration program was modified by resetting the user-parameter to maintain accuracy and incur higher costs, and then a new impulse response created. FIG. 11 represents the same vertical slice as in FIG. 6, from this new run. FIG. 12 is the amplitude display computed from FIG. 11, showing that now the amplitudes vary smoothly, as desired. The differences between the amplitudes in FIGS. 8 and 12 are significant and important, but they cannot be discerned through the traditional approach of visually comparing the impulse responses (FIGS. 6 and 11). This demonstrates the resolution and power of the quantitative method of the present invention.

Figure 13:
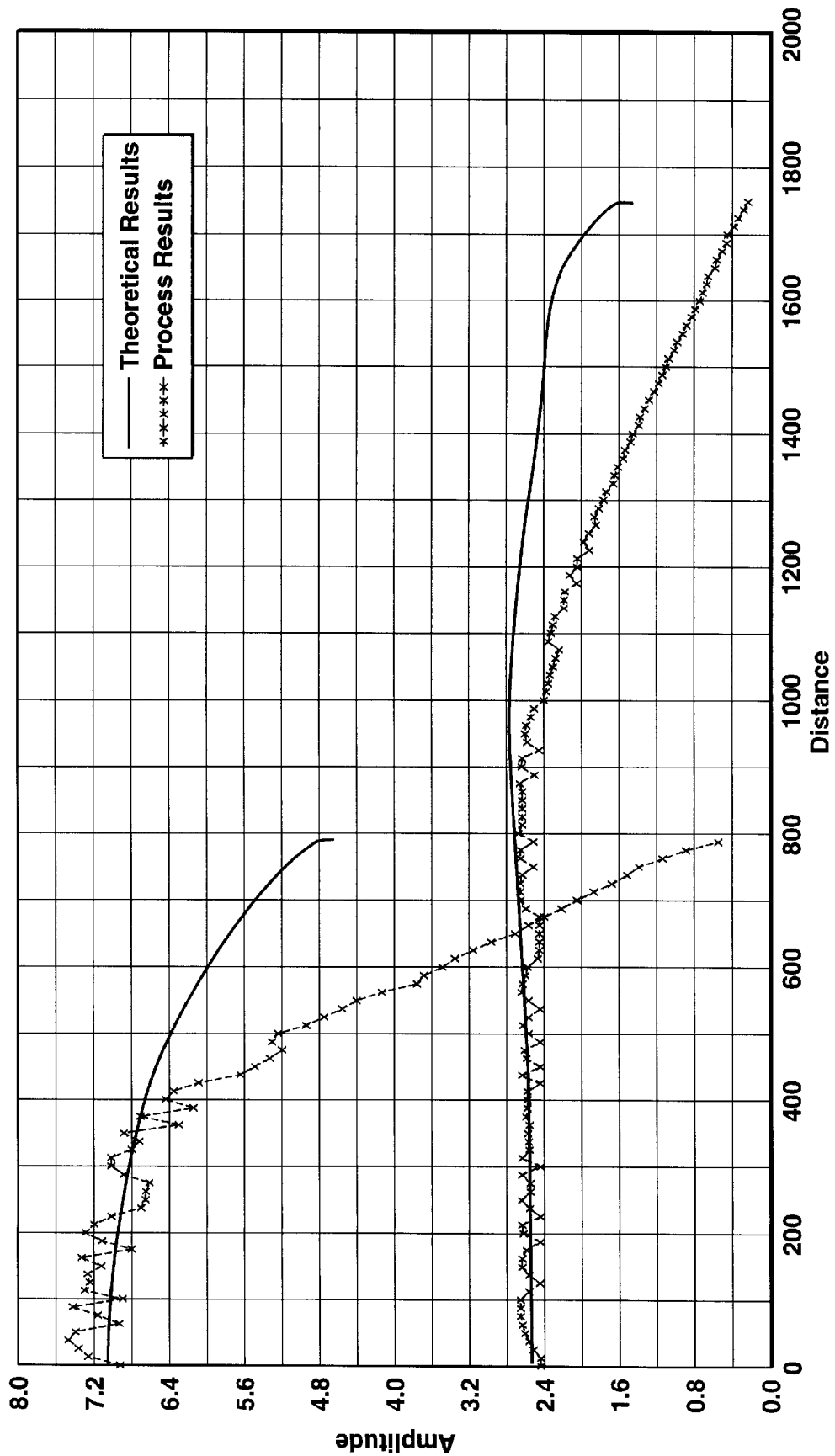
Figure 14:
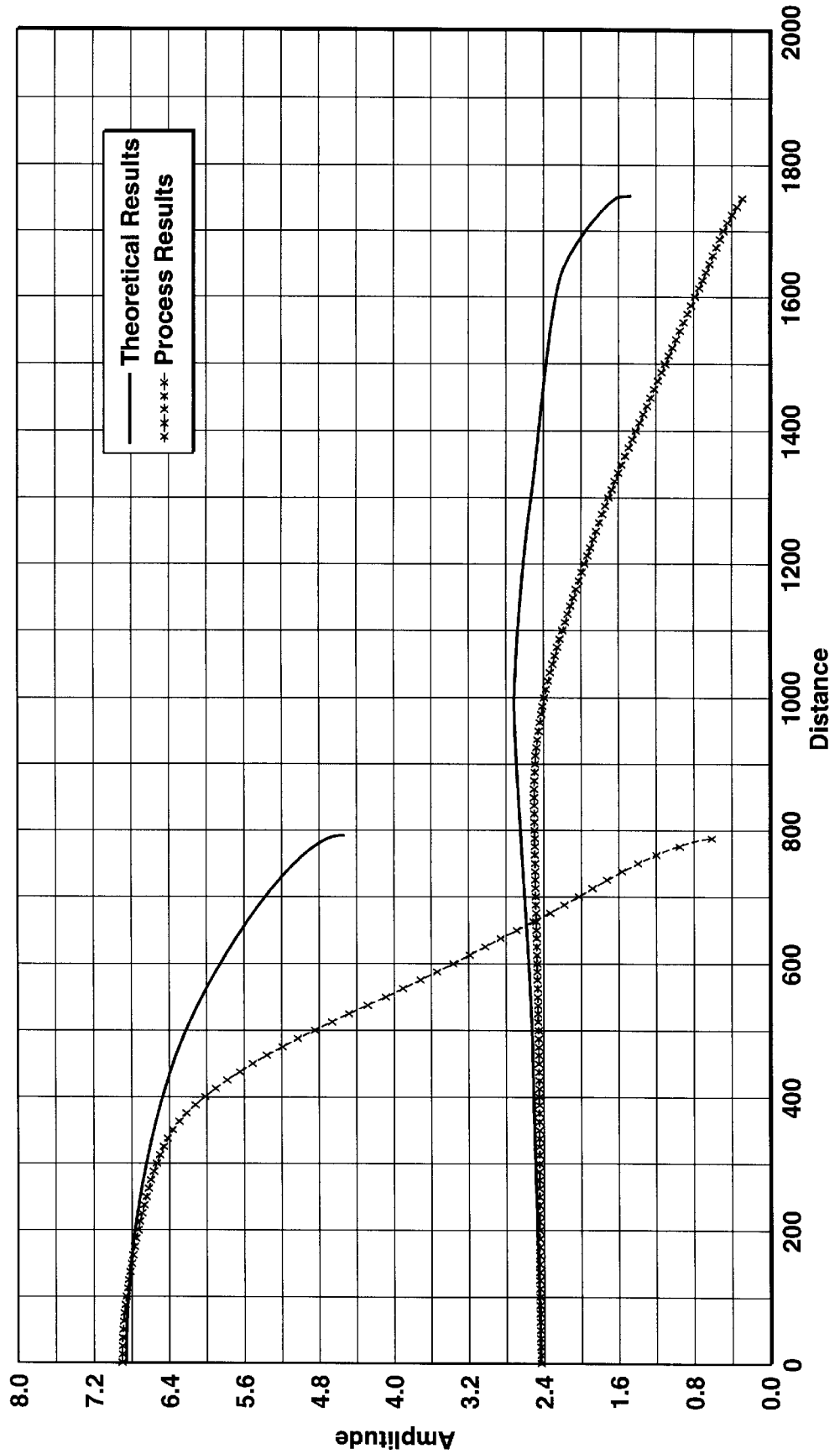

Decreasing the trace spacing would reduce spatial aliasing and the amplitude drop off with distance (or dip angle) indicated in FIGS. 8 and 12. Vertical slices were again extracted from the impulse response volumes, but this time the slice direction was parallel to the x-axis, where trace sampling was 12.5 m. The slices were passed through the program, which produced the amplitude plots of FIGS. 13 and 14. The only difference between the plots FIGS. 13 and 14 and those in FIGS. 8 and 12, is the reduced trace spacing (from 25 m to 12.5 m). The plots of FIGS. 13 and 14 show the improved amplitude match obtained by reducing the trace spacing, and by using appropriate user-parameter settings that maintain accuracy.

This again demonstrates the usefulness of the quantitative method of the present invention. Here it was used to understand how changes in the trace sampling change the amplitude fidelity of migrated images. Clearly it can be understood, therefore, that to image steep dips, with this velocity model, fine trace spacing (12.5 m or less) is needed. It is also to be noted that the 3-D impulse response was computed with coarser trace spacing in the y-direction than in the x-direction (25 m vs. 12.5 m). This is common for 3-D seismic marine processing, and through the quantitative method of the present invention described here, one can learn just how much better imaging will be in the x-direction (12.5 m) than in the y-direction (25 m).

Figure 15:
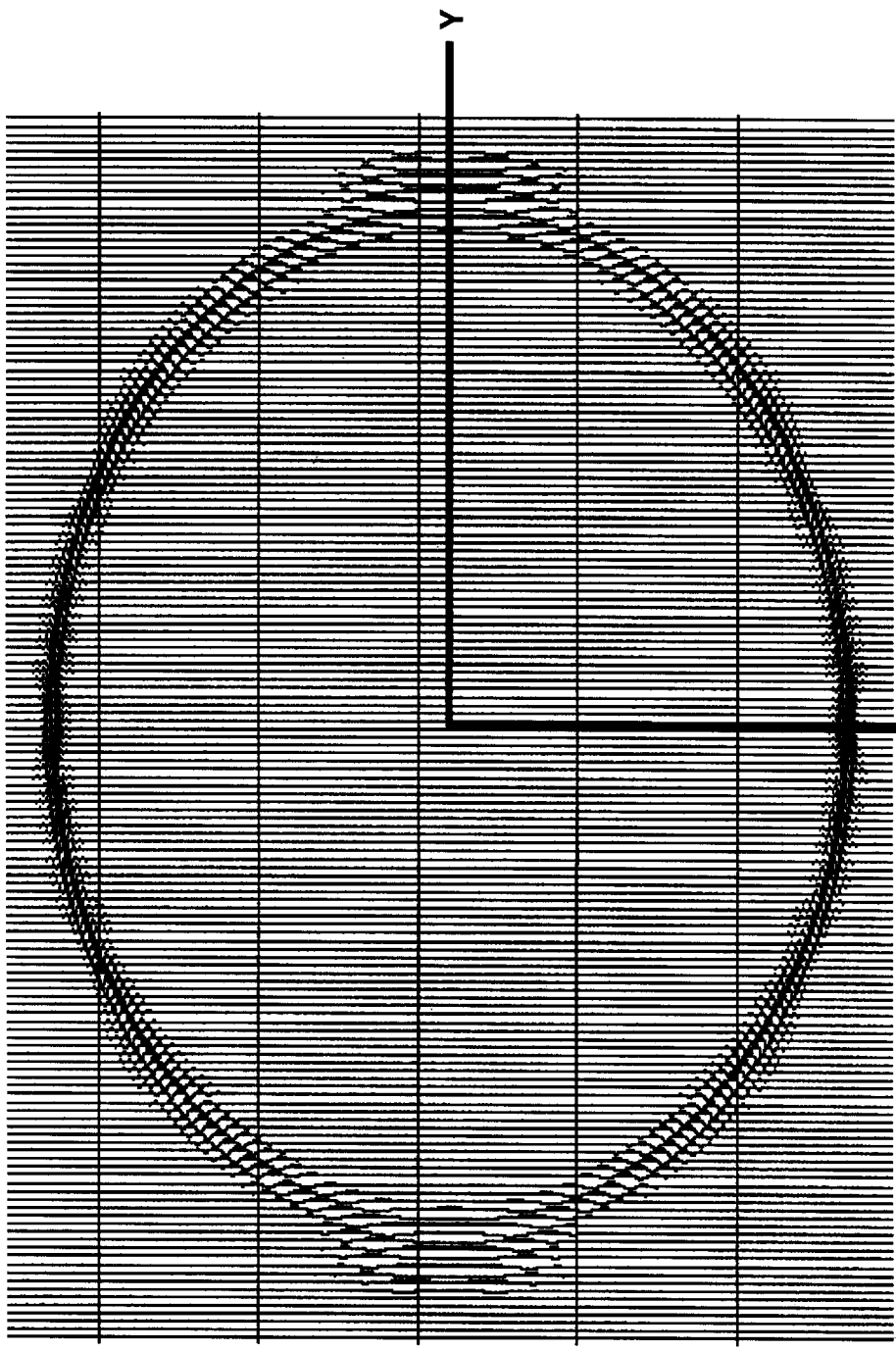
FIG. 15 is another plot of output data traces representing a computed impulse response formed according to the present invention.
Figure 16:
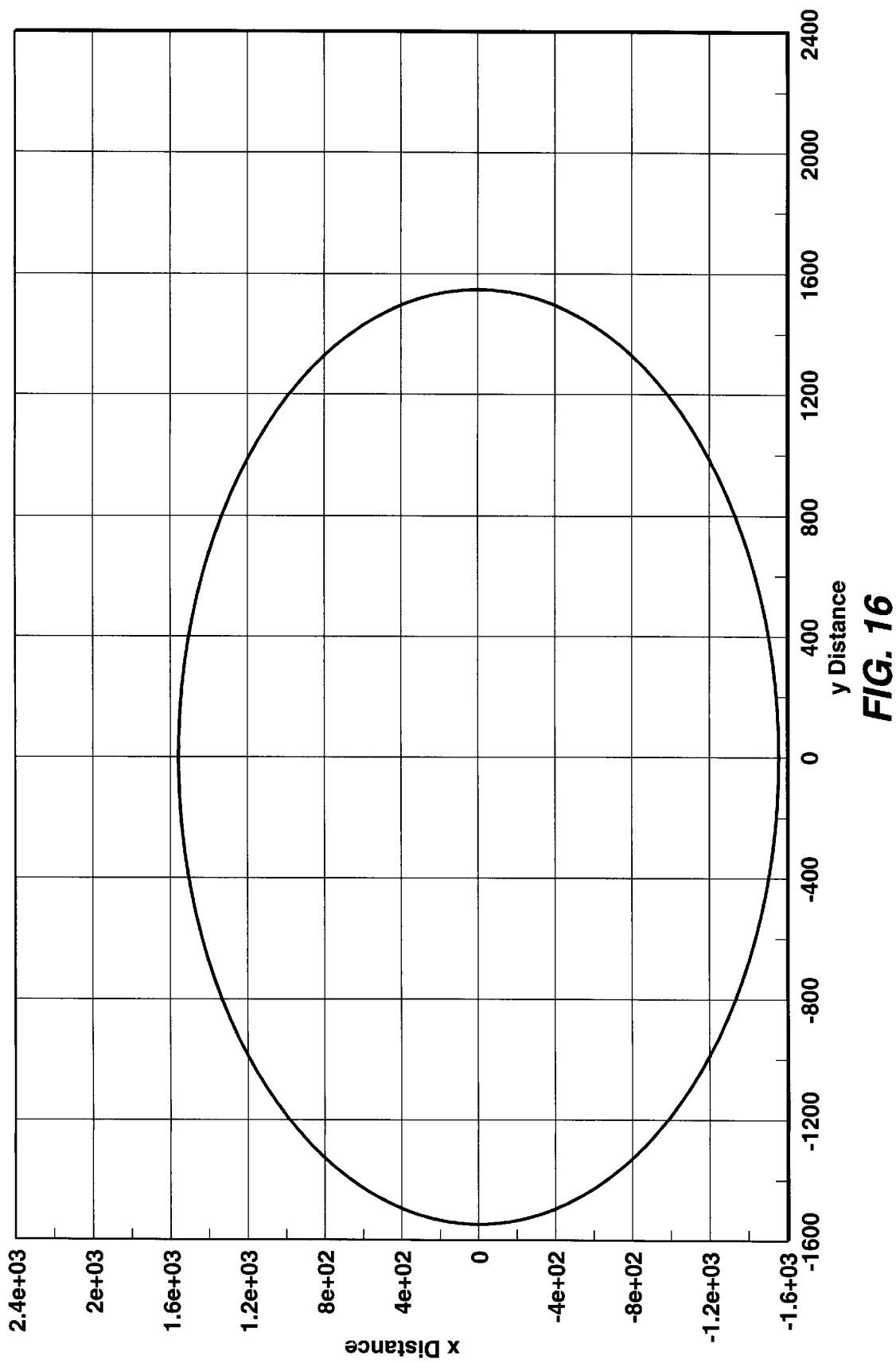
FIG. 16 is a plot of vertical traveltime from the data of FIG. 15.
Figure 17:
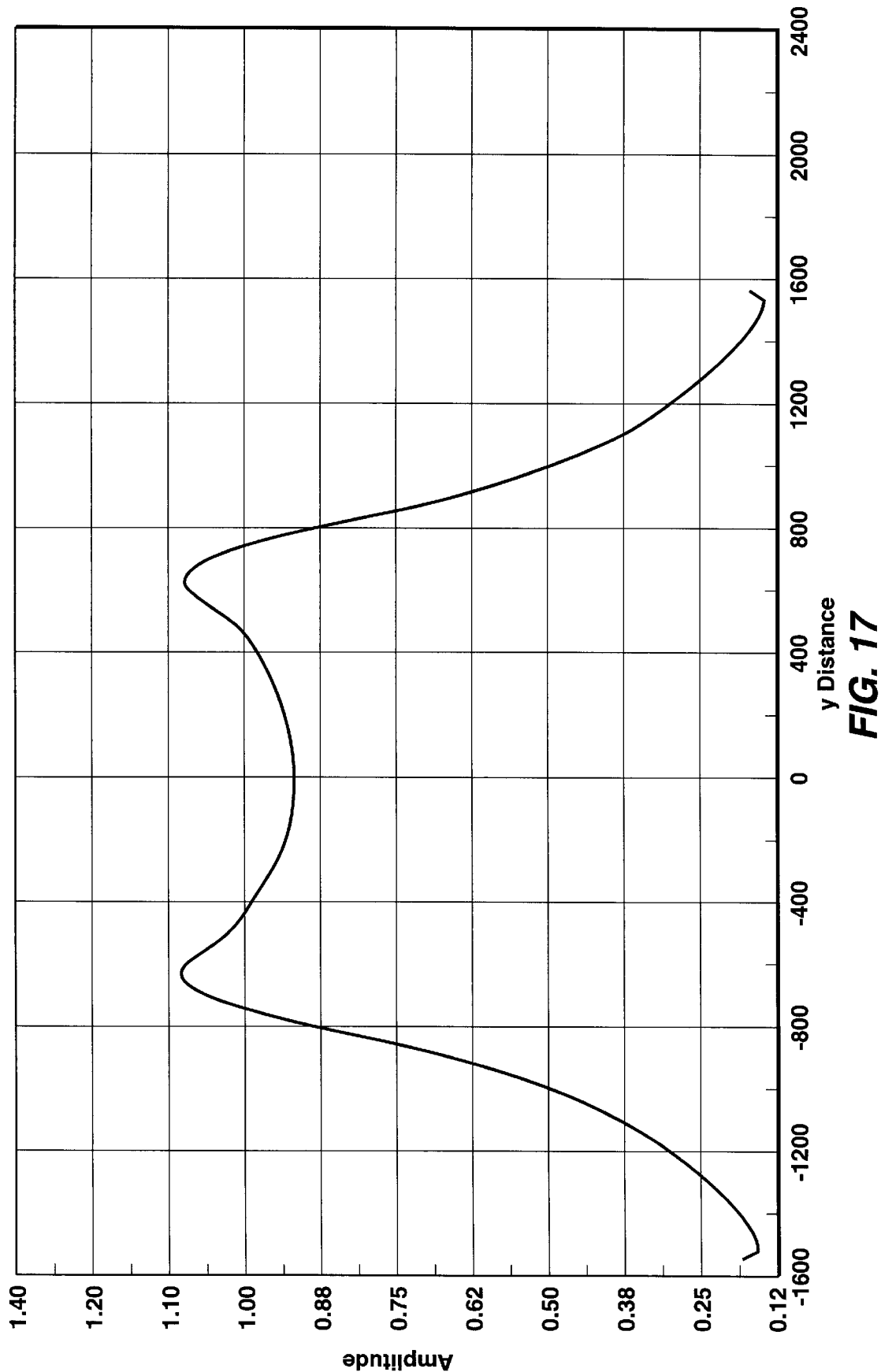
FIG. 17 is a plot of amplitude from the data of FIG. 15.

Finally, another way of evaluating 3-D impulse responses - through horizontal slices - is shown. A horizontal slice, at time =1.2s, was extracted from the original impulse-response volume and plotted in FIG. 15. This time slice now shows the 3-D intersection of the 2.0 s impulse-response event with the horizontal plane at time τ=1.2 s (compare FIG. 6). The vertical direction is the x-direction and the horizontal direction is the y-direction in FIG. 15. This slice was evaluated with the program of the present invention, and vertical traveltime, amplitude, and phase were computed as before. FIGS. 16 and 17 show the vertical traveltime and amplitude plots, respectively. Poststack 3-D time migration operators are azimuthally symmetric, so in time slices, impulse responses should have circular shape, with constant amplitude and phase. FIG. 16 shows the theory event and the actual impulse-response event where it intersects the 1.2 s horizontal plane. Good agreement is exhibited, since theory and actual curves overlie one another. FIG. 17 shows amplitude, along the bottom and top halves of the impulse-response event of FIG. 15, plotted as functions of y. It can be seen that at y=0, which is on the x-axis, strong amplitude is present, but for large y, which is near x=0, weak amplitude is present. This is again the consequence of spatial aliasing and trace spacings of dx=12.5 m and dy=25 m. These conclusions support what was seen when comparing FIGS. 8 and 12 for vertical slices.

From the foregoing, it can be seen how 3-D poststack time migration can be used to demonstrate various ways in which one may quantitatively analyze computed 3-D impulse responses. This information may be used to accurately predict how imaging software will perform on real data. It should be understood that 3-D prestack time migration software may be analyzed similarly, as well as 2-D or 3-D DMO. Also, depth migration software may be revaluated analogously, although the procedure becomes more difficult as the velocity function is allowed more degrees of freedom.

The foregoing disclosure and description of the invention are illustrative and explanatory thereof, and various changes in the data acquisition and processing sequences, the parameters selected and analyzed, as well as the processing sequences described, as well as in the details of the process of operation described above, may be made without departing from the scope of the present invention.

We claim:

1. A computer-implemented method for forming comparative plots to enable quantitative evaluation of the functionality of a computer software program for imaging seismic data, said method comprising the steps of:
   a) creating an impulse data set in the computer containing a single live impulse data trace and a plurality of dead data traces, said live impulse data trace containing at least one wavelet;
   b) inverse filtering said impulse data set in the computer to compensate for natural filtering resulting from processing said impulse data set in the computer with said imaging software program;
   c) processing said impulse data set in the computer using said imaging software program and a seismic velocity function representative of the seismic velocity of a portion of the earth's subsurface to produce a set of processed impulse-response data traces;
   d) forming an output plot representative of an attribute of interest in said set of processed impulse-response data traces;
   e) computing a set of corresponding theoretical impulse-response events using said seismic velocity function; and
   f) forming an output plot representative of an attribute of interest in said theoretical impulse-response events for comparison with the output plot of the attribute of interest in said processed impulse-response data traces to enable quantitative assessment of the accuracy of said imaging software program.

2. The method of claim 1, further including the step of:
   determining the value of the attribute of interest for a selected location in said processed impulse-response data traces.

3. The method of claim 2, wherein said attribute of interest is vertical traveltime.

4. The method of claim 2, wherein said attribute of interest is depth.

5. The method of claim 2, wherein said attribute of interest is amplitude.

6. The method of claim 2, wherein said attribute of interest is phase.

7. The method of claim 1, further including the step of:
   determining the value of an attribute of interest for a selected location in said processed computed theoretical impulse-response events.

8. The method of claim 7, wherein said attribute of interest is vertical traveltime.

9. The method of claim 7, wherein said attribute of interest is depth.

10. The method of claim 7, wherein said attribute of interest is amplitude.

11. The method of claim 7, wherein said attribute of interest is phase.

12. The method of claim 1, further including the step of:
    determining the value of an attribute of interest for a selected location in said processed impulse-response data traces; and
    determining the value of an attribute of interest for a selected location in said processed computed theoretical impulse-response events.

13. The method of claim 12, wherein said attribute of interest is vertical traveltime.

14. The method of claim 12, wherein said attribute of interest is depth.

15. The method of claim 12, wherein said attribute of interest is amplitude.

16. The method of claim 15, further including the step of:
    computing a scale factor between the amplitude of impulse-response data traces and the theoretical impulse-response events.

17. The method of claim 16, further including the step of applying the scale factor to the amplitude of the impulse-response data traces.

18. The method of claim 12, wherein said parameter of interest is phase.

19. The method of claim 1, wherein said step of computing a set of corresponding theoretical impulse-response events is performed based on an exploding reflectors migration model.

20. The method of claim 19, wherein the exploding-reflectors migration model is represented by the following mathematical expression:

$$P(x,y,z,t=0) = -\frac{1}{2\pi} \iint dx_0 dy_0 \cdot$$

$$\frac{\partial \tau}{\partial z_0} \left( \sqrt{\frac{1}{\det Q}} \right)^* \cdot \left[ \frac{\partial P(x_0,y_0,z_0,t)}{\partial t} \right]_{t=\tau}$$

21. The method of claim 1, wherein said step of computing a set of corresponding theoretical impulse-response events is performed based on a zero offset migration model.

22. The method of claim 21, wherein the zero offset migration model is represented by the following mathematical expression:

$$P(x,y,z,t=0) = -\frac{1}{2\pi} \iint dx_0 dy_0 \cdot \frac{\partial \tau}{\partial z_0} \cdot \left[ \frac{\partial P(x_0,y_0,z_0,t)}{\partial t} \right]_{t=\tau}$$

23. The method of claim 1, wherein said step of computing a set of corresponding theoretical impulse-response events is performed based on a common offset migration model.

24. The method of claim 23, wherein the common offset migration model is represented by the following mathematical expression:

$$P_h(x,y,z,t=0) = -\frac{1}{2\pi} \iint dy_1 dy_2 \cdot$$

$$w(y_1,y_2,z_0,h,x,y,z) \cdot \left[ \frac{\partial P(y_P,y_2,h,z_0,t)}{\partial t} \right]_{t=\tau_S+\tau_G}$$

25. The method of claim 1, wherein said step of computing a set of corresponding theoretical impulse-response events is performed based on a common offset DMO model.

26. The method of claim 25, wherein the common offset DMO model is represented by the following mathematical expression:

$$P_0(y_0, t_0, h) = \int_{\eta \cdot h}^{h} d\eta \, w(y_0, y_n, t_0, t_n, h) \cdot P_n[y_n(y_0, \eta), t_n(t_0, \eta), h] * \delta_{1/2}[-t_n(t_0, \eta)]$$

27. The method of claim 1, wherein said step of computing a set of corresponding theoretical impulse-response events is performed based on a prestack migration model.

28. A method for evaluating the functionality of a computer software program for imaging seismic data, said method comprising the steps of:
   (a) creating an impulse data set containing a single live impulse data trace and a plurality of dead data traces, said live impulse data trace containing at least one wavelet;
   (b) inverse filtering said impulse data set to compensate for natural filtering resulting from processing said impulse data set with said imaging software program;
   (c) selecting a seismic velocity function representative of the seismic velocity of a portion of the earth's subsurface;
   (d) processing said impulse data set using said imaging software program and said seismic velocity function to produce a set of processed impulse-response data traces;
   (e) computing the corresponding theoretical impulse-response events using said seismic velocity function; and
   (f) comparing said theoretical impulse-response events computed in step (e) to said processed impulse-response data traces from step (d) to assess the accuracy of said imaging software program.

29. The method of claim 28, wherein said impulse data set is a two-dimensional (2D) data set and said step of inverse filtering is done with $(i\omega)^{-\frac{1}{2}}$.

30. The method of claim 28, wherein said impulse data set is a three-dimensional (3D) data set and said step of inverse filtering is done with $(-i\omega)$.

31. The method of claim 28, wherein said step of comparing said theoretical impulse-response events to said processed impulse-response data traces comprises quantitatively comparing attributes of said theoretical impulse-response events to those of said processed impulse-response data traces.

* * * * *